Jan. 14, 1969 L. A. JACOBSON 3,421,500

MAGNETIC ORTHOPEDIC DEVICE

Filed Oct. 8, 1965 Sheet 1 of 4

INVENTOR
LUDWIG A. JACOBSON by: Wolfe, Hubbard, Voit & Osann
ATTYS.

INVENTOR
LUDWIG A. JACOBSON
by: Wolfe, Hubbard, Voit & Osann
ATTYS.

MAGNETIC ORTHOPEDIC DEVICE

Filed Oct. 8, 1965

INVENTOR
LUDWIG A. JACOBSON
by: Wolfe, Hubbard, Voit & Osann
ATTYS.

INVENTOR
LUDWIG A. JACOBSON by: Wolfe, Hubbard, Voit & Osann
ATTYS.

3,421,500

MAGNETIC ORTHOPEDIC DEVICE

Ludwig A. Jacobson, 4433 Prescott, Lyons, Ill. 60534

Filed Oct. 8, 1965, Ser. No. 494,142
U.S. Cl. 128—75 10 Claims
Int. Cl. A61n *1/02*

ABSTRACT OF THE DISCLOSURE

A portable orthopedic device employing magnetic forces to flex and rehabilitate body members which have been stiffened or weakened due to injury, arthritis, or the like. The device includes a magnetic element attached to a body member on one side of a body joint and a second magnetic element attached to the other side of the body joint. The attaching means for one of the magnetic elements is adjustable for selectively positioning that magnetic element with respect to the body member and the other magnetic element so that a magnetic force is produced between said elements which tends to flex the body joint. The illustrated embodiments include apparatus for flexing the hand, arm and spine.

This invention relates generally to orthopedic therapeutic devices and more particularly to portable orthopedic devices using magnetic forces in the rehabilitation of body members.

It is an object of the invention to provide a novel orthopedic therapeutic device which may be used to rehabilitate and mobilize body members which have been stiffened or weakened by such causes as injury, arthritis, or confinement in a cast.

Another object is to provide an orthopedic device which employs magnetic forces to impart a steady and gentle pull on a stiffened body member while being adapted to exert an increasingly greater pull on the stiffened member as resistance to movement of the body member increases. It is a related object to provide a device of the above kind in which the magnitude of the magnetic forces may be varied.

It is a further object to provide an orthopedic device as characterized above that is light in weight and compact in design and may be adjustably secured to a body member.

Still another object is to provide an orthopedic device that is portable and compact in design so that a person may receive continuous therapeutic treatment while maintaining freedom of movement. It is a related object to provide a portable orthopedic device that may be used while transporting patients who otherwise would normally be required to be confined in traction.

Other objects and advantages of the invention will become apparent upon reading the following detailed description and upon reference to the drawings, in which.

Figures 4, 5:
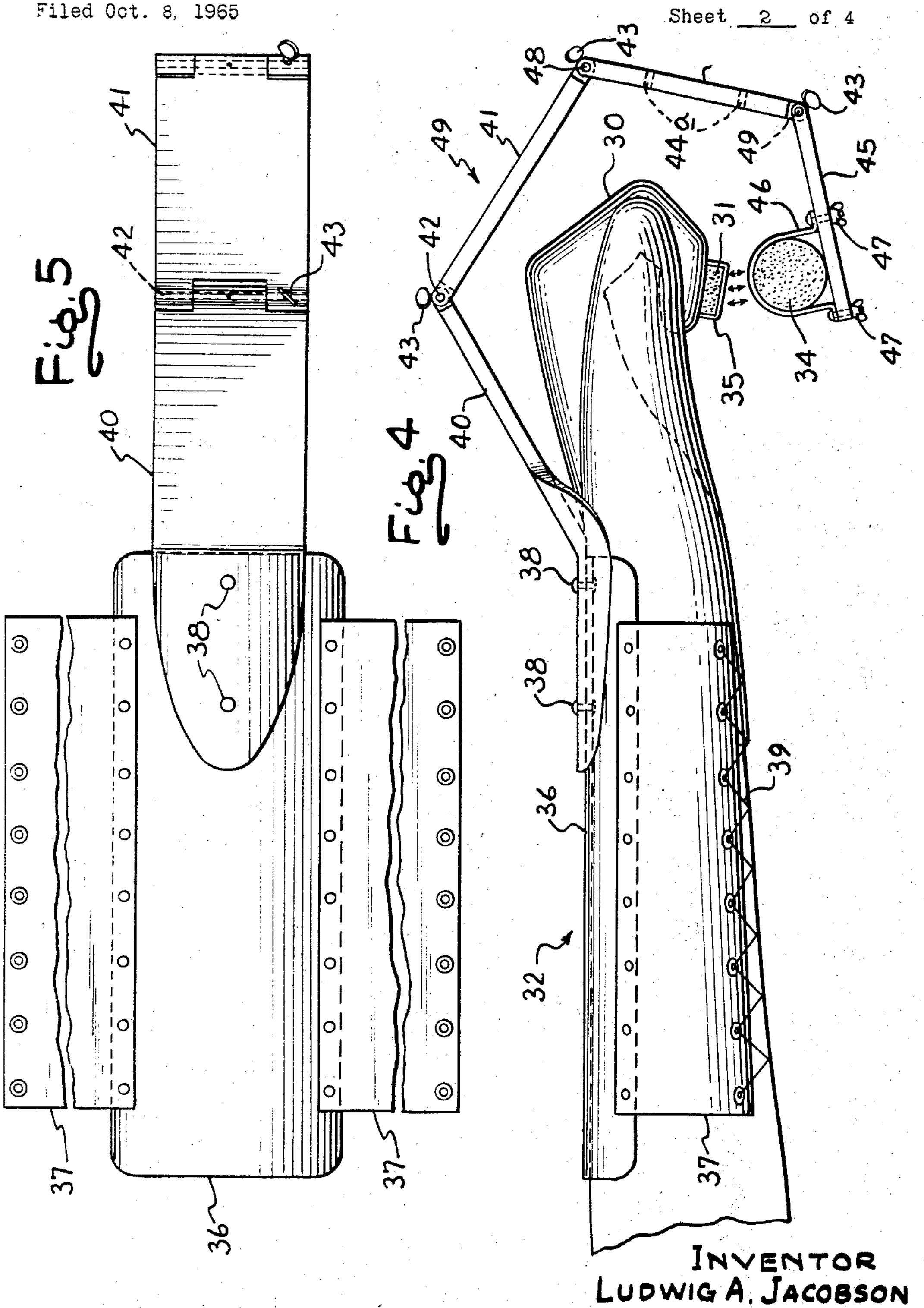
Figures 6, 7, 8:
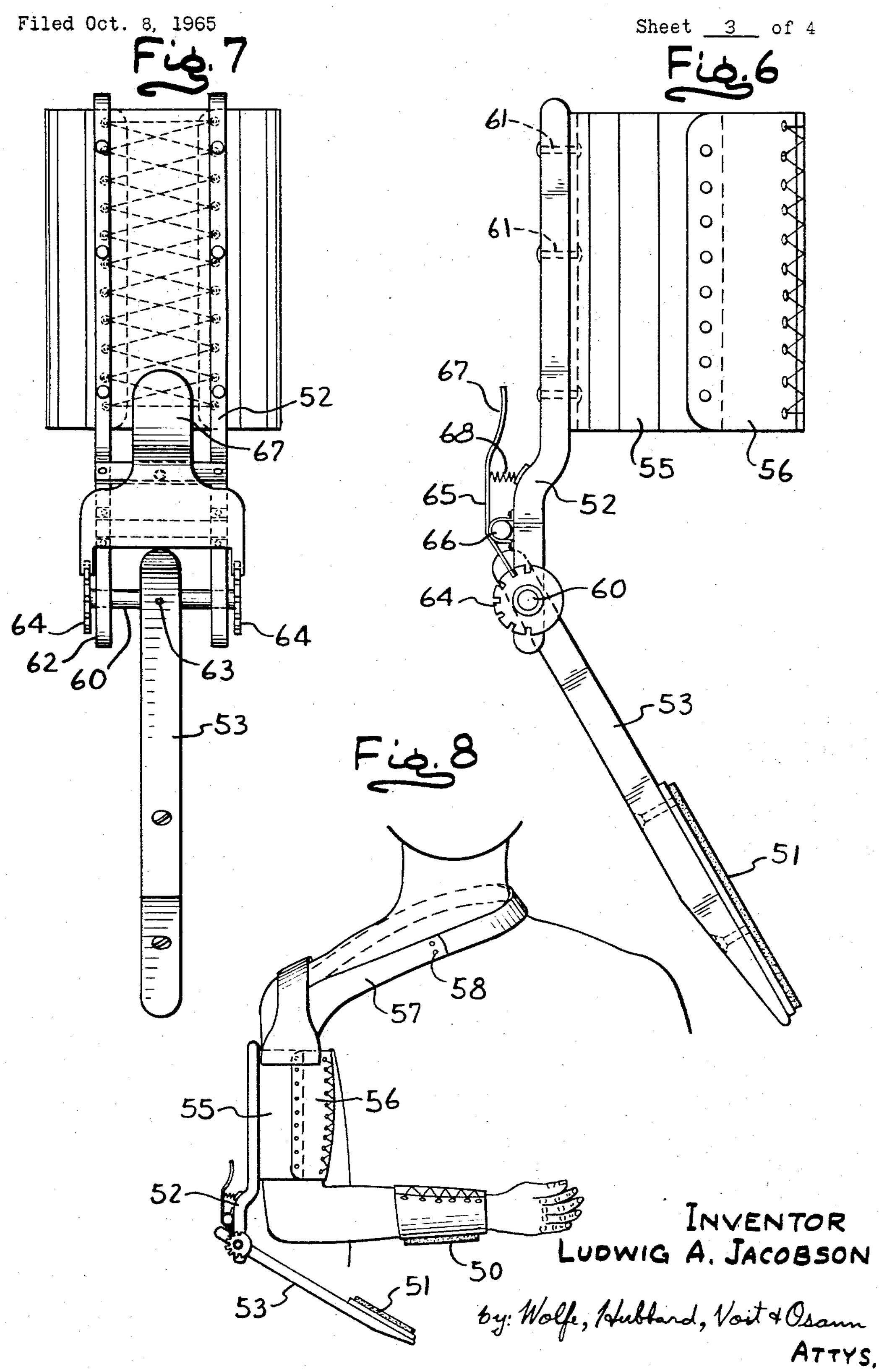
Figure 10:
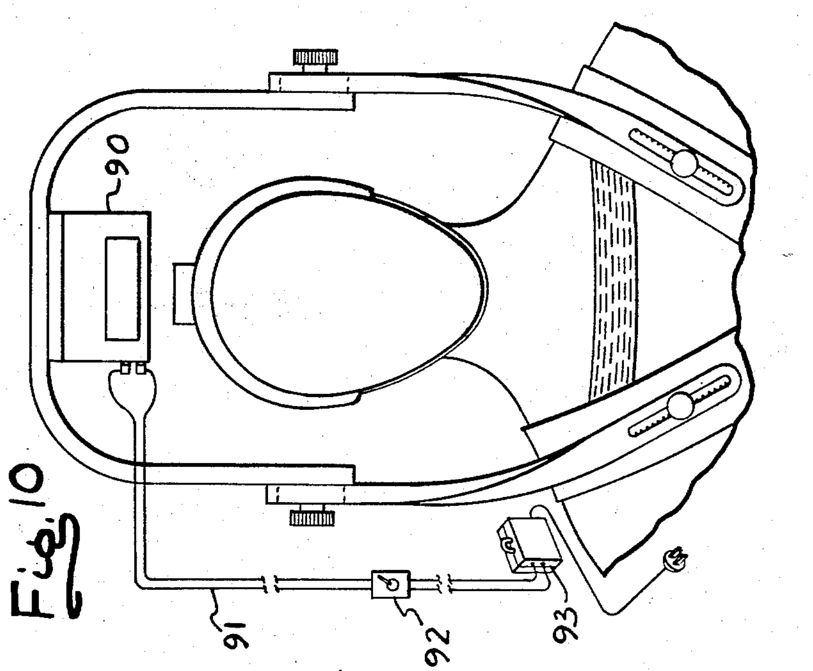
Figure 9:
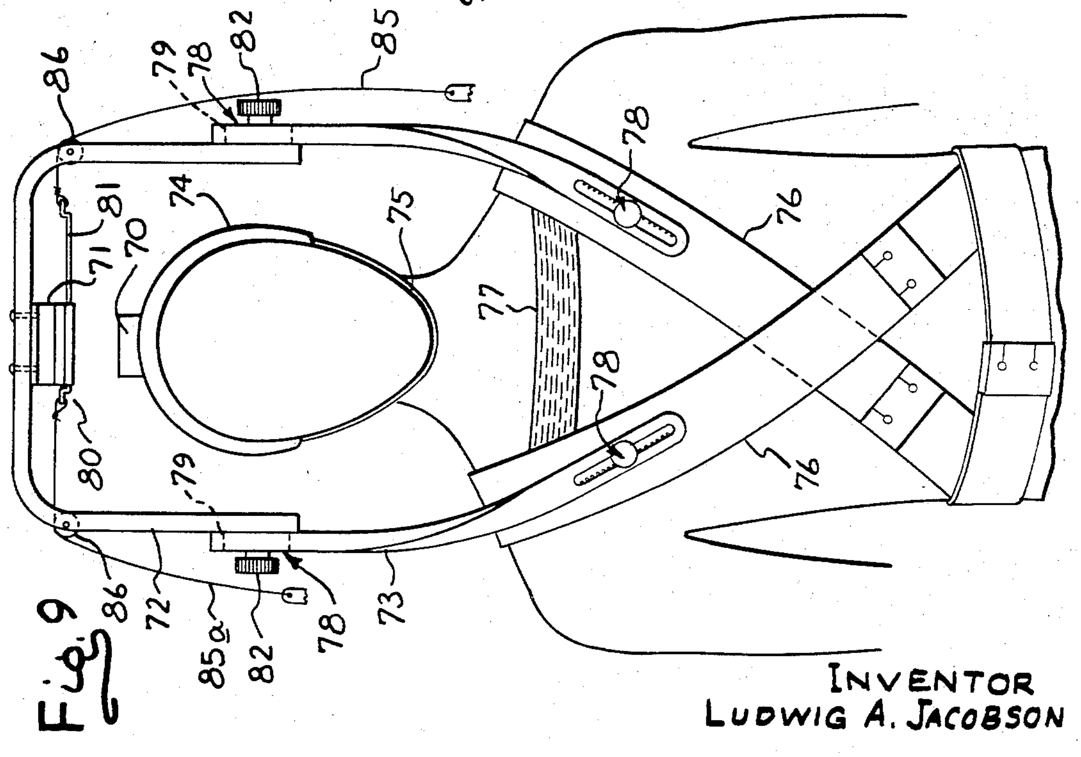

FIGS. 3*a–d* are a series of views illustrating the use of the glove in applying force to flex a stiffened hand;

FIG. 4 is a side elevational view of another embodiment of the invention for use on the hand;

FIG. 5 is a top view of the device shown in FIG. 4;

FIG. 6 is a front elevational view of another form of the invention which may be used for improving the movement of an injured or stiffened arm;

FIG. 7 is a side elevational view of the device shown in FIG. 6;

FIG. 8 is a plan view of the device shown in FIG. 6 being used to flex the arm;

FIG. 9 is a front view of another embodiment of the invention for use in applying a pulling force to the neck and cervical spine; and FIG. 10 is a front view of a modified form of the device shown in FIG. 9.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined in the appended claims.

Figures 1, 2, 3A, 3B, 3C, 3D:
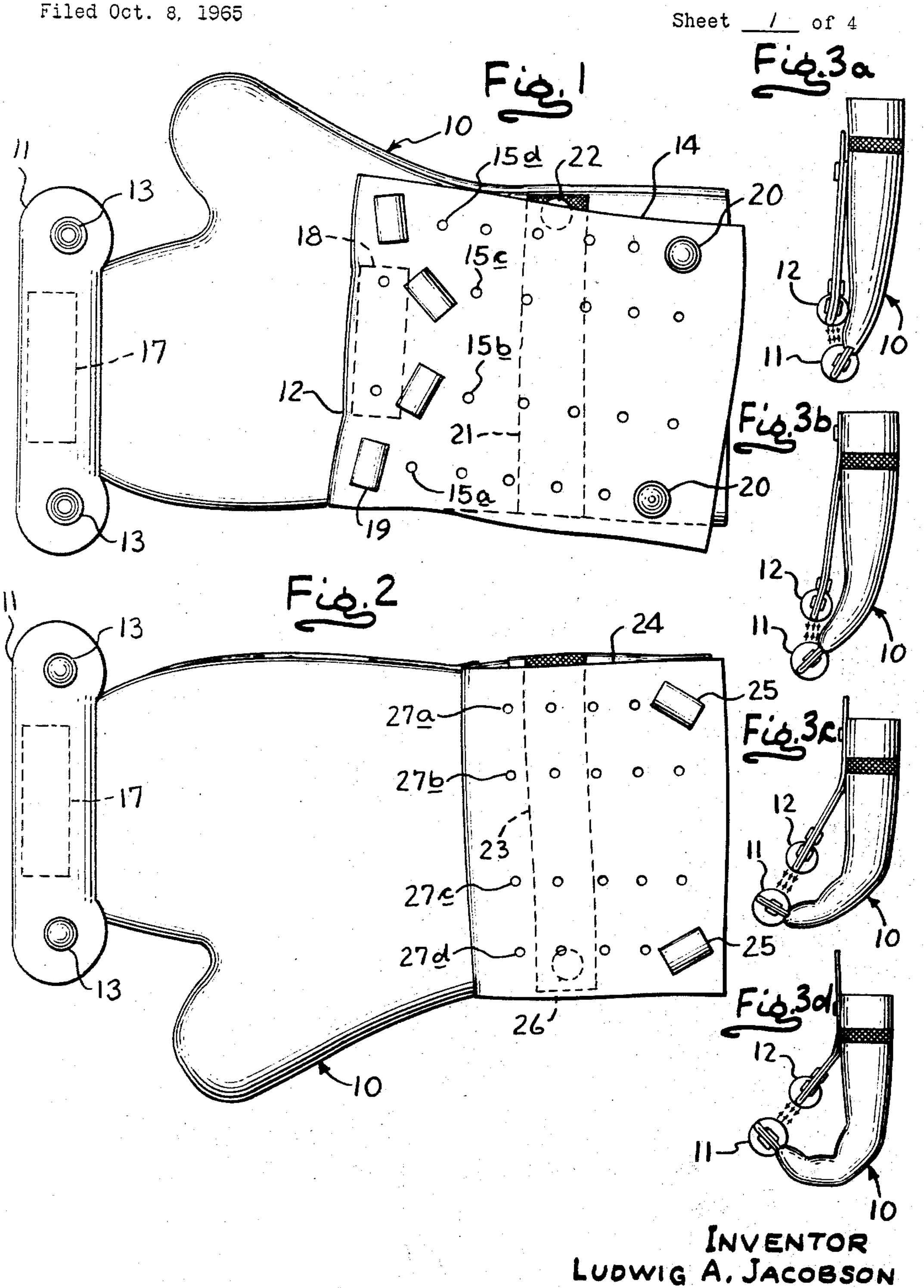
FIGURE 1 is a plan view of the palm side of an orthopedic glove exemplifying the present invention for use with treatment of the hand.
FIG. 2 is a plan view of the reverse side of the glove shown in FIG. 1.

For the purpose of illustration, FIGS. 1 and 2 show one embodiment of the invention which may be used for improving the movement of the hand. The glove 10, preferably made of a soft flexible material such as seal skin, may be adapted for use on either hand, although in the illustrated form the glove is shown for use on the right hand. The glove has a compartment 11 at the finger tip end containing one magnetic element 17 and an adjustable compartment 12 shown on the palm of the glove containing a second magnetic element 18.

The magnetic elements may be any two pieces of material which impart magnetic forces upon each other when brought within a magnetic field created by either one or both of the materials. Therefore, the magnetic elements both may be permanent magnets, or it is possible to have a permanent magnet contained in one compartment and a piece of material such as steel which is attracted in a magnetic field contained in the other compartment.

The compartment 11 at the finger tip end of the glove is formed by a folded-over flap fastened to, and extending beyond the finger tip ends. Fasteners 13 are located on each side of the flap such that either one of the fasteners may be unfastened for access to the compartment to replace the magnetic element. The adjustable compartment 12 is formed from a flap 14 which has four lengthwise series of holes 15, **15*a*, 15*b*, 15*c* punched therein and which is attached to the heel or wrist section of the glove. The compartment 12 is formed by folding the flap 14 back on itself around the second magnetic element 18 at the appropriate position and inserting four fasteners or clamps 19 through overlying holes in each series of holes in the flap while in the folded position. The magnetic element 18 in the adjustable compartment may be located at various distances from the finger tip compartment 11 according to where the flap is folded and clamped. In FIG. 1, the magnetic element 18 is shown in an intermediate position. After the adjustable compartment has been formed and fastened, the remaining end portion of the flap 14 can be secured to the glove by two fasteners 20** which may be fastened at any of several locations along the wrist and heel section of the glove.

To maintain the glove firmly on the hand, two elastic bands 21, 23 are provided, one of which may be releasably fastened in a stretched condition under the flap 14 on the palm side of the glove, while the other may be releasably fastened under the flap 24 on the back side of the glove. The fasteners 22, 26 that secure the bands 21, 23 are both located on the thumb side of the glove, making them easily accessible by the free hand whether the glove is worn on the right hand as shown or on the left hand as will be described below.

When the glove is to be used to restore movement of a weak or stiffened hand, the adjustable compartment 12 is formed so that the magnetic element 18 contained therein will be positioned sufficiently close to the magnetic element in the finger tip compartment 11 so that a magnetic force is created between the two elements. In the example shown in FIG. 3*a*, the hand is stiffened in a nearly flat position. The adjustable magnetic element 12, therefore, is located at the extreme forward position so that a force is created between the magnetic elements, causing a constant pulling force to be exerted upon the finger tips 11.

The steady pulling force should eventually cause the finger tips to bend slightly. The hand then may be exercised by straightening the finger tips with the free hand if the hand being exercised is not strong enough and then allowing the magnetic force again to pull the finger tips to a bended position. As movement is regained in the finger tips, the magnetic element 17 in the finger tip compartment will be pulled into contact with the adjustable magnetic element 18. At this time, the adjustable compartment 12 should be changed closer to the heel of the hand by opening the fasteners 19 on the flap 14, and refolding and fastening the flap farther from the finger tips. This will move the adjustable magnetic element 18 a greater distance from the finger tips as shown in FIG. 3*b* to cause greater flexing of the finger joints. The adjustable magnetic element should be positioned so that when the joint is flexed as much as possible the magnetic elements remain spaced apart with a constant pulling force acting between the elements. As motion of the hand is still further improved, additional adjustments by folding and fastening the flap 14 nearer to the heel of the glove may be made as shown in FIG. 3*c* and *d*.

It should be appreciated that the orthopedic device of the present invention produces an increased pulling force upon the stiffened body member as the joint becomes more difficult to flex. Since the adjustable magnetic element is positioned so that the pulling force is exerted when the stiffened body joint is initially flexed as much as possible, additional movement of the body member becomes increasingly more difficult. As slight additional flexing takes place due to the steady pulling force, however, the magnetic elements are moved closer together causing a greater magnetic force to be created to meet the increased resistance.

The magnetic glove also may be used to restore motion to a hand that is cramped in a bended position. In such case, magnets having fields that repel each other may be inserted into the compartments 11, 12. This may be done by reversing one of the magnetic elements to position like poles of the elements 17, 18 on the same side, rather than opposite sides. The adjustable compartment 12 again is positioned sufficiently close to the finger tip compartment that the magnetic fields of the contained magnetic elements cause a repelling force which tends to open the hand. The hand may be exercised in a manner similar to that described above and the position of the adjustable compartment changed as motion in the hand is regained.

The glove in the illustrated form may be converted for use on either hand. FIGURES 1 and 2 show the glove adapted for use on the right hand. The adjustable magnetic element is contained in the compartment 12 made from the flap 14 on the palm side of the right hand. On the reverse side of the glove shown in FIG. 2, a second flap 24 substantially the same as flap 14 on the palm side is provided. Flap 24 is similarly attached to the glove adjacent the heel or wrist position and has four corresponding series of fastening holes 27*a*, 27*b*, 27*c*, 27*d*. When the glove is to be used on the left hand, the flap 24 may be used to make an adjustable compartment in the same manner as described in connection with the flap 14.

When either of the flaps 14 and 24 is not in use, it may be conveniently folded over toward the cuff of the glove and fastened to it by suitable fasteners 25 as shown for flap 24 in FIG. 2. The fasteners for use with the glove of FIGS. 1 and 2 may be of any suitable form, such as spring snap fasteners 13, 20, fold over studs 19 or the like.

Another embodiment of the invention which also may be applied to the hand is shown in FIGS. 4 and 5. The apparatus shown is comprised of two separate components, a glove 30 fitted for the hand containing one magnetic element 31 and a support 32 fitted for the wrist and forearm with projecting linkage 49 carrying a second magnetic element 34. The glove 30 which may be made of soft flexible leather is fitted with a compartment 35 at the finger tips which encloses the magnetic element 31.

The support 32 is comprised of an aluminum plate 36 shaped to the form of the forearm and wrist having leather strips 37 riveted on each side which may be wrapped around the arm and laced, as at 39 together to secure the cast plate firmly to the arm. The linkage 49, also preferably made of aluminum, is attached to the plate 36 and projects over and around the hand while carrying the second magnetic element 34.

The first section 40 of the linkage, which is secured rigidly to the arm plate 36 by means of rivets 38, is curved upward at one end to provide clearance space for an injured hand or wrist. The second section 41 of the linkage is connected to the first section 40 by means of a hinge 42 about which the second section may be rotated. Similarly, third and fourth sections 44, 45 of the linkage are adjustable in relation to the respective preceding sections of the linkage by suitable hinge joints 48, 49. The second and third sections 41, 44 may be rigidly secured in a desired position by tightening set screws 43, at the hinge joints. It is possible, therefore, to arrange the linkage in various desired configurations and to hold the selected configurations rigidly by tightening the set screws 43.

In the illustrated form, the fourth section 45 of the linkage rigidly carries a cylindrical magnetic element 34 by means of two brackets 46, each secured to the link by a pair of studs and wing nuts 47. The linkage is adjusted so that the magnetic element 34 is sufficiently near the magnetic element 31 contained in the finger tip compartment 35 of the glove to cause a force to be exerted upon the hand. Depending on the magnetic elements used, as described above, the finger tips may be pulled toward the magnetic element on the linkage or repelled therefrom.

Assuming that the magnetic fields attract, the hand gradually will be pulled open and may be exercised by clinching the hand and allowing it again to be pulled open. When motion in the hand is restored so that the magnetic elements come into contact easily, the magnetic element 34 on the linkage may be moved farther away from the finger tips by loosening the set screws 43 and adjusting the linkage.

When the hand is capable of opening to a greater extent, it may be desirable to have the magnetic element on the linkage carried by the third section 44, rather than the fourth section 45. The magnetic element may be removed from the fourth section by unscrewing the wing nuts 47 and removing the brackets 46 and studs. Holes 44*a* are provided in the third section 44 enabling the same brackets, studs and wing nuts to be used in securing the magnetic element to that section.

The magnetic elements may be of various sizes and strengths since they can be adjusted by separating to produce a desired traction. For the hand device, it has been found that magnetic elements requiring 15 pounds pull to separate are preferable.

Another embodiment of the invention is a device for restoring motion to an arm as shown in FIGS. 6–8. In this device one magnetic element 50 is attached to the wrist and a second magnetic element 51 is carried by linkage 52, 53, which is attached to the upper arm and projects a distance out from the arm.

The magnetic element 50 on the wrist is contained in the pocket of a leather cuff or support 54 that is laced together around the wrist. The second magnetic element 51 and linkage 52, 53 are supported by an aluminum plate 55 formed to fit the upper arm and having leather strips 56 riveted on each side. The strips 56 extend around the sides of the upper arm and can be laced together to hold the aluminum piece firmly on the arm. To provide additional support for the plate and linkage, a leather support strap 57 attached to the upper end of the plate may be placed around the neck and fastened together by a releasable snap 58.

The first section of linkage 52 has an upper portion secured rigidly to the aluminum plate 55 by rivets 61 and a lower end portion which curves out from the arm to permit straightening of the elbow. The second link 53 is an aluminum bar which may be rotated with respect to the first link 52 and carries the magnetic element 51 at the far end. The adjustable link 53 is secured to the first link 52 by a shaft 60 that passes through the end of the second link 53 and is journalled in two leg portions 62 at the lower end of the first link 52. A pin 63 passes through the shaft 60 and the second link 53 to prevent rotation between these two parts.

To secure the second link 53 rigidly with respect to the first link 52, a circular disc 64 with a slotted periphery is rigidly fixed on each end of the shaft 60. The end of a stopping member 65 may be engaged in selected slots of the discs 64 to maintain the adjustable second link 53 in a desired position. The stopping member 65 is welded to a pivot rod 66 which is bracketed to the lower end of the first link to permit rotational movement of the member 65. To adjust the position of the second link 53, the handle end 67 of the stopping member 65 is pressed against the force of a spring 68 interposed between the handle 67 and link 52 causing the lower end of the member 65 to disengage from the slots in the discs 64 and thus releasing the second link for rotation to a desired position. When the handle 67 is released, the spring 68 forces the lower end of the plate 65 to engage in the proper slot to lock the second link 53 in position.

The magnetic element 51 at the end of the second link 53, therefore, may be adjusted to a position near the magnetic element on the wrist so that the magnetic fields of the elements cause a force to be exerted on the arm. As discussed above, either an attracting force or a repelling force may be employed depending on the magnetic elements used. Preferably, for therapy on the arm, the magnetic elements should be capable of creating 20 to 25 pounds of pulling force. The arm may be exercised in a manner similar to that described for the hand and as motion is regained the magnetic element 51 on the second link may be adjusted.

Although not shown, it should be appreciated that apparatus similar to that used for the arm could also be employed for use on the leg. A cast plate supporting a linkage which carries one magnetic element could be formed to fit the leg above the knee, and a second magnetic element could be attached to the leg below the knee. Further, the linkage of both the hand and arm apparatus could easily carry an electromagnet rather than a permanent magnet.

The present invention may also be used in apparatus for treating stiffness in the neck and cervical spine as shown in FIGS. 9 and 10. In the illustrated form, one magnetic element 70 is attached to the top of the head while the second magnetic element 71 is carried by adjustable linkage 72, 73 supported on the shoulders.

The magnet element 70 on the head is contained in a pocket of a head piece 74 made of a light weight netting or cloth material. The head piece 74 is secured on the head by means of a chin strap 75 and a second elastic strap not shown around the back of the head.

The linkage 72, 73 carrying the second magnetic element 71 is comprised of a top yoke shaped part 72 and two lower V-shaped supporting parts 73 formed to rest on the shoulders. These parts preferably are made of aluminum to provide a light-weight rigid construction. The linkage is supported on an adjustable cross belt 76 preferably made of metal strips covered with leather or protective material. The shoulder portions of the cross belt 76 are connected in the front and back with an elastic strap 77 to prevent lateral movement of the linkage. On the underside of the belt at the shoulder portions, foam rubber padding is provided to cushion the weight of the linkage.

The linkage may be vertically adjusted by means of rack and pinion connections 78 between the yoke 72 and the V-shaped links 73 and between the V-shaped links 73 and the cross belt 76. The yoke 72 may be adjusted vertically by turning the pinions 82 which are held in rotational engagement by the legs of the yoke and mate with the racks formed in the slots 79 of the V-shaped links 73. Similarly, the V-shaped links may be vertically adjusted with respect to the cross belt. The magnetic element 71 carried by the yoke 72, therefore, may be positioned an appropriate distance from the magnetic element 70 attached to the head to cause a pulling force to be exerted on the head.

When a pulling force is employed in therapy on the neck or spine, the force generally is applied for only several minutes at a time with one or two minutes of rest between each application. Therefore, in the illustrated form the magnetic element 71 carried by the linkage is a permanent magnet (preferably capable of pulling 25 to 30 pounds) with a shunting device 80 which may be used to interrupt the force exerted on the head. The shunt is comprised of a steel plate 81 with an opening the approximate size of the magnet. The plate 81 is carried for sliding engagement in brackets provided on the underside of the magnet 71.

The plate may be moved by pulling one of the two nylon cords 85, 85*a* which are fastened to opposite ends of the plate and carried over pulleys 86 on the respective sides of the yoke. When the shunt is in the position shown in FIG. 9, the opening in the shunt is in register with the permanent magnet 71. The magnetic field from the permanent magnet causes a constant pulling force to be exerted on the magnetic element 70 attached to the head. This magnetic force may be shunted out at any desired time by pulling the nylon cord 85*a* causing the steel plate to be moved so that the opening in the shunt is no longer in register with the magnet.

The above device provides a constant pulling force to be exerted on the head, the magnitude of which may be easily controlled by means of the shunting device. A significant advantage of this device is that it is completely portable so as to permit a person in traction who would be normally confined to a bed or a stationary chair to have more complete freedom of movement.

An alternative embodiment of the head apparatus is to replace the permanent magnet by an electromagnet as shown in FIG. 10. The electromagnet 90 is of well-known construction and preferably should be capable of creating a magnetic pull of 30 pounds with a one-quarter-inch air gap. For convenience, means are provided for operation of the electromagnet by a commonly available 110-volt alternating current source. For this purpose, several feet of electrical cord 91 connect the electromagnet with the control switch 92 and carrying case 93 which contains a rheostat, rectifier, and automatic timing device. Suitable rheostats, rectifiers and timing devices are well known in the art and need not be described in detail here. The length of the cord permits the controls to be easily accessible.

The rheostat of a type commonly known permits the magnetic pull to be adjusted to various magnitudes. The automatic timing device also may be set so that the electromagnet will automatically be turned on and off at the required intervals as is often required in spinal therapy.

I claim as my invention:

1. A portable orthopedic device comprising in combination a pair of magnetic elements, a first means for attaching a first one of said elements to a first part of the human body on one side of a body joint, a second means for attaching the second of said elements on the other side of said body joint, and at least one of said attaching means being adjustable to selectively position its associated magnetic element with respect to the body and the other magnetic element to produce a magnetic force between said magnetic elements which tends to flex the body joint.

2. Claim 1 in which at least one of said attaching means includes a substantially rigid linkage for holding said respective magnetic element at a selected distance from the other said magnetic element.

3. Claim 1 in which one of the magnetic elements is an electromagnet with means for varying the magnetic field of said electromagnet.

4. Claim 1 in which one of the magnetic elements is a permanent magnet having a shunt which is movable between said magnetic elements for varying the magnetic force.

5. The orthopedic device as defined in claim 1 including a glove having a finger tip end portion and a heel portion and in which said first attaching means is positioned at the finger tip end of said glove and adapted to hold said first magnetic element, and said second attaching means is positioned adjacent said heel portion, said second attaching means being adapted to position said second magnetic element at a predetermined position relative to said first magnetic element.

6. The orthopedic device of claim 5 in which a second attaching means is a flap joined at one end to said glove and is adapted to be folded about said second magnetic element, said flap having a series of coacting fastening means for holding said second magnetic element a selected distance from said first magnetic element.

7. The orthopedic device of claim 1 in which the first attaching means maintains the magnetic element securely adjacent said first body part, said second attaching means includes a support piece adapted to be secured to the body opposite said body joint, and said support piece having substantially rigid linkage secured thereto for holding the second magnetic element a selected distance from the first magnetic element so that a magnetic force may be created between said elements.

8. The orthopedic device of claim 1 in which the first attaching means maintains the magnetic element securely adjacent said first body part, said second attaching means includes a support piece having resilient strips secured on opposite sides which are adapted to be wrapped around a body member and secured so as to hold the support piece to said body member, substantially rigid linkage secured to said support piece for carrying the second magnetic element, said linkage being comprised of a plurality of links connected together by hinged joints and adapted to be arranged in a configuration so that the magnetic element carried on said linkage may be placed a selective distance from the other magnetic element, and means for rigidly securing said joints in the desired configuration so that a magnetic force created between said elements causes a steady force to be exerted on said first body part.

9. The orthopedic device as defined in claim 1 in which the first attaching means is a helmet adapted to be worn on the head, said helmet having means for holding said first magnetic element, said second attaching means includes an adjustable supporting belt adapted to be secured to the body and having portions adapted to pass over the shoulders of the body, linkage means secured to the shoulder portions of said belt for carrying the second magnetic element, and said linkage means being vertically adjustable so that said second magnetic element may be located at a predetermined position relative to the magnetic element contained in said helmet so as to cause a magnetic force to be created between said elements.

10. The orthopedic device as defined in claim 9 in which the linkage means includes a pair of V-shaped supports connected to the shoulder portion of said belt and being vertically adjustable with respect thereto by means of rack and pinion connections, said linkage also including a top link formed to extend between said supports and over the head, means attaching said second magnetic element to said top link and rack and pinion connections between the end portions thereof, and said supports for vertical adjustment of said magnetic element relative to said first magnetic element.

References Cited

UNITED STATES PATENTS

| | | | |
|---|---|---|---|
| 2,803,879 | 8/1957 | Cook | 32—2 |

FOREIGN PATENTS

| | | |
|---|---|---|
| 20,530 | 5/1918 | France. |
| 1,024,205 | 2/1958 | Germany. |
| 111,276 | 11/1917 | Great Britain. |

L. W. TRAPP, *Primary Examiner.*

U.S. Cl. X.R.

128—25; 272—80